United States Patent Office 3,490,887
Patented Jan. 20, 1970

3,490,887
FERROELECTRIC GLASS-CERAMICS
Andrew Herczog, Painted Post, and Margaret M. Layton, Big Flats, N.Y., assignors to Corning Glass Works, Corning, N.Y., a corporation of New York
No Drawing. Filed Mar. 30, 1966, Ser. No. 538,548
Int. Cl. C03b 27/00, 25/00; C03c 21/00
U.S. Cl. 65—33                                       8 Claims

ABSTRACT OF THE DISCLOSURE

This invention relates to a method of improving ferroelectric materials formed by the crystallization from the glass state (glass-ceramics) for use in electronic components such as capacitors by including in the glass batch from .05–5.0 weight percent cuprous oxide, crystallizing the glass and then heat treating the crystallized glass so as to outwardly diffuse the cuprous ion thereby improving the electrical resistivity and the dielectric constant of the glass-ceramic, and possibly creating copper contacts or terminals at the surface of the glass-ceramic.

---

The state of oxidation of ferroelectric materials strongly influences their performance in capacitors. Removal of oxygen from the ferroelectric crystal lattice decreases the electrical resistivity of the material, or, conversely, renders it more electrically conducting. This may result in failure of the material by electrical breakdown when exposed to operating temperatures of 50–200° C. and/or to D.C. electric fields in excess of $10^4$ volts/cm.

Loss of oxygen from the perovskite, or other oxygen-octahedral, lattice of ferroelectric materials, e.g., the titanates, niobates, zirconates, ore tantalates of Group I and II elements, usually takes place during the preparation of the material. The temperature of preparation is in the range of 1100°–1500° C. where oxygen partial pressure is relatively high. As a consequence, a loss of oxygen on the order of 0.01–0.1% or more of the available lattice sites usually takes place. This oxygen loss can be corrected in ordinary sintered ceramics by firing and slow cooling in an oxidizing atmosphere. The pores present in the sintered material enable direct access of the oxygen into the interior of the material thereby facilitating the oxidation process.

Glass-ceramic ferroelectric materials, such as those described in United States Patent No. 3,195,030, are made by partial crystallization of a homogeneous glass and hence are non-porous. This is of considerable advantage in that it provides a material of high dielectric constant and high dielectric breakdown strength, as well as other desirable electrical characteristics. However, it obviously interferes with the obtaining of gas-phase oxidation of the material such as previously obtained with conventional porous ceramic materials. Direct diffusion of oxygen through the glassy or glass-ceramic material is normally too slow to be practical.

It is a basic purpose of the invention then to provide a method of increasing the state of oxidation, and thereby the electrical resistivity, in a ferroelectric glass-ceramic material. Another purpose is to impart a uniformly high state of oxidation to such a material whereby it will remain stable with respect to change of dielectric constant and of other properties under severe changes in environmental and electrical conditons. A further purpose is to improve the insulation strength and resistance to electrical breakdown of ferroelectric glass-ceramic materials, thereby providing improved materials and improved products embodying such materials.

We have found, quite surprisingly, that these and other purposes can be achieved by providing a minor amount of copper oxide in the composition of the glass from which such a glass-ceramic material is crystallized. More specifically, we have found that, under certain conditions, the copper ions in such a material can be induced to migrate outwardly to the surface of the material. We have further found, that, when such outward migration of copper ions occurs, there is a concurrent oxidation of the ferroelectric material depleted of copper. We now set forth our explanation of this phenomenon without in any way intending that our invention be limited thereby.

The state of oxidation of a material is determined by the ratio of cations (metal ions) to anions (e.g., oxygen and halogen ions). To the extent that a material does not exist completely in its highest state of oxidation, it may be considered either as being deficient in anions or as containing an excess of cations. Further, this deficient condition may be corrected either by increasing the anion content of the material or by decreasing the cation content.

As has been explained earlier, the oxygen or anion deficiency in a porous ferroelectric material may be nearly corrected by firing in an atmosphere of the oxygen which permeates through the pores and reacts with the pores to correct the deficiency. However, in glass or glass-ceramic materials, this corrective measure is not applicable, so it becomes necessary to resort to an alternative mechanism whereby cations are removed by diffusion to reduce their concentration.

In ferroelectric glass-ceramics, copper is present in the cuprous state, that is, the singly-charged ionic state. This form of copper ion happens to be particularly effective as a diffusing species in these materials. The singly-charged cuprous ion has an ionic radius of 0.96 angstrom units as compared to 1.4 angstrom units for the doubly-charged oxygen ion. We believe that this difference in ionic radii, together with the difference in electrical charge, explains the reason why cuprous ions diffuse much more rapidly within a glass-ceramic material than do oxygen ions.

In any event, when a glass-ceramic material containing a suitably limited amount of cuprous ions is subjected to a selected heat treatment, the cuprous ions on the surface of the material react with oxygen from the ambient atmosphere to produce copper oxide. It appears that copper is thermodynamically more stable as an oxide than as a constituent ion in the oxygen-deficient glass-ceramic. As copper oxide forms on the surface of the glass-ceramic, the layer immediately underneath is depleted of cuprous ions. Consequently, cuprous ions from deeper in the material migrate outwardly to replace those which have been oxidized. It is our belief that this outward diffusion or migration of copper ions in a ferroelectric glass-ceramic material is initiated by formation of copper oxide on the surface and is a continuous process or cycle of such oxide formation and migration of copper ions to replace the oxidized ion. As a result then, the interior of the glass-ceramic material becomes depleted of cations and the ratio of anions to cations increases.

We have observed that the copper oxide initially forms on the surface of the glass-ceramic material as microscopically small crystallites. However, if the concentration of copper in the material is sufficiently great and the combination process of diffusion and oxidation is carried on for a sufficient time, a continuous film of copper oxide forms on the surface of the material. We have further found that this film can be transformed, by a moderate reduction treatment that does not affect the glass-ceramic, to a metallic film of copper. This film is suitable, either directly or by further treatment such as electroplating, for capacitor electrodes. It is then a further purpose of our invention to provide a means of producing electrodes, or electrical terminal connections, on ferroelectric glass-ceramic bodies to facilitate the production of electrical devices from such bodies.

Based on these discoveries, and in furtherance of the stated purposes, our invention contemplates a method of improving the electrical properties of ferroelectric glass-ceramic materials of the types described and claimed in Patent No. 3,195,030 which comprises including 0.05–5.0% copper oxide as an additive in the glass from which the glass-ceramic material is crystallized, and heat treating the material, either during or subsequent to the crystallization of said glass-ceramic material from the original glass, at a temperature within a 300° C. range, the lower limit of which is slightly above the annealing point of the glass, the time of heat treatment being sufficient to cause diffusion of a substantial amount of the copper ions to the surface of the glass-ceramics material but not exceeding that required to completely remove the copper ions from the interior of the material by outward diffusion.

Several variables or parameters must be considered in selecting conditions for practicing the present invention. These include the amount of copper incorporated in the glass initially, the time and temperature of the heat treatment to effect copper diffusion, the type of glass-ceramic being improved by the copper diffusion, the thickness of the body involved, and the degree of diffusion desired or required for a particular application. To some extent, these various factors are interrelated as indicated in the following discussion of their effective ranges.

The amount of copper initially included in the glass composition will depend in large measure on the purpose to be achieved. If the sole or primary purpose is to increase the electrical resistivity of the glass-ceramic material by cationic depletion as a form of oxidation, the copper content should not exceed about 0.5%. It becomes difficult to sufficiently remove larger amounts from the material, and failure to do so may impair uniformity of the electrical characteristics in the body. Also, in some applications, the presence of copper in the surface of the body is undesirable. Hence, where more than about 0.5% copper is utilized, an unwanted plating effect can result. A content of at least 0.05% is necessary to provide any appreciable effect on resistivity.

At least 0.3% is usually necessary to provide an effective continuous film for terminal or electrode production. In the event that formation of a terminal of electroplating film is the sole or primary purpose, a copper content of from 1–5% is desirable. With a copper oxide content in this range, a continuous film may be built up on the surface of the material quite rapidly even though a substantial amount of copper may still remain within the body of the material. However, with such higher copper content, and especially with a content over 5%, the resistivity of the glass-ceramic-material may be decreased to an undesirable extent.

It has been observed that the present diffusion mechanism, whereby copper ions are caused to diffuse to the surface of a glass-ceramic material, is surprisingly sensitive to temperature. Thus, the rate of diffusion becomes appreciable at a temperature slightly above the annealing point of the parent glass, that is, at a temperature of 10–30° C. above the annealing point depending on the magnitude of that temperature. With increasing temperature, the diffusion rate increases to a maximum and then decreases so that the temperature range within which the mechanism is effective is about 300° C. At still higher temperatures, the diffusion process reverses so that there is a tendency for copper to diffuse inwardly in the material, rather than outwardly as desired.

The maximum or optimum temperature for the crystallization process ($T_{CM}$), that is, the process of converting the glass to the glass-ceramic, is on the order of 100–200° C. above the upper limit of the effective range of temperatures for diffusion. Consequently, it is normally necessary to carry out the crystallization and diffusion processes separately, the crystallization process normally being carried out initially because of its higher temperature. However, in some instances where a partial crystallization may be sufficient, it is possible that the two processes may be carried out simultaneously within the effective diffusion temperature range.

The effective diffusion temperature range for any particular ferroelectric glass ceramic material cannot be defined in absolute terms. Rather, it is a variable dependent on the annealing point of the material and therefore the type of material. In order to better illustrate the nature of this variable, numerous exemplary compositions from United States Patent No. 3,195,030 were examined to determine various thermal characteristics for three types of ferroelectric glass-ceramic material. These were barium titanate with a silicate matrix, barium titanate with a borate matrix, and niobate materials. The temperature characteristics ascertained for each material were the annealing point, the approximate lower limit ($T_L$) and upper limit ($T_H$) of the effective range for outward diffusion of copper, and the temperature ($T_{CM}$) at which a maximum degree of crystallization occurs in the material. The data thus obtained are set forth in the following table.

TABLE I

| Glass-Ceramic Examples Listed in Patent No. 3,195,030 | Annealing Point, ° C. | $T_L$ ° C. | $T_H$ ° C. | $T_{CM}$ ° C |
|---|---|---|---|---|
| BaTiO₃-Silicate (Examples 1–16) | 660–690 | 700 | 1,000 | 1,200 |
| BaTiO₃-Borate (Examples 32, 33, 35, 36, 39) | 530–540 | 550 | 850 | 900 |
| Niobates (Examples 75–83, 86–88) | 620–640 | 650 | 950 | 1100 |

The amount of copper caused to migrate to the surface of the glass-ceramic material by diffusion may provide an approximate measure of the degree of improvement achieved in electrical properties for one of the present copper-containing materials. The maximum degree of improvement is attained by complete removal or diffusion of the copper to the surface. Short of this, the ratio of copper removed to the total amount available for removal, is an approximation of the degree of improvement.

The time required for complete diffusion of copper out of the material is dependent on the temperature of the process, the total amount of copper in the material and the thickness of the sample being treated. Within the range of copper contents presently involved, the approximate time required for essentially complete outward diffusion of copper may be expressed by the formula $t=d^2/D_T$. In this formula, $t$ is the time expressed in minutes, $d$ is the thickness of the material in microns, and $D_T$ is a constant related to the coefficient of diffusion. The manner in which the diffusion constant ($D_T$) varies with the temperature of treatment and the type of glass-ceramic being treated is shown in the following table:

TABLE II.—VALUES OF THE CONSTANT $D_T$

| Material | 750 ° C. | 800 ° C. | 850 ° C. | 900 ° C. | 950 ° C. |
|---|---|---|---|---|---|
| BaTiO₃ (Silicate) | | | 2 | 20 | 50 |
| Niobates | 3 | 50 | 130 | 30 | 5 |

The diffusion time, that is, the time required for essentially complete removal of copper from a particular material under a particular set of conditions, can be calculated on the basis of the foregoing data and/or formula. This represents the time required for an optimum degree of oxygen enrichment, and consequent improvement in resistivity and other electrical properties, in accordance with the invention. No substantial benefit is derived from employing a longer time of treatment. On the other hand, a shorter treatment time may be employed depending on the degree of improvement required in any given application. Inasmuch as the amount of copper removed by diffusion per unit time decreases exponentially with time, a relatively large degree of improvement may be attained in a short time at the beginning of a heat treatment.

As indicated earlier, the amount of copper that must be removed from a material is also dependent on the particular purpose or effect that is desired. The following table sets forth the different effects that might be desirable to achieve in a given application, the amount of copper required in the material for that purpose, and the range of diffusion time that will provide some degree of benefit or effect for the desired purpose:

TABLE III

| Desired Effect | Cu in material, percent | Diffusion time (t=calculated value) |
|---|---|---|
| 1. $O_2$-enrichment only | 0.05-0.5 | 0.02t to t. |
| 2. $O_2$-enrichment and plating | 0.3-1 | 0.1t to t. |
| 3. Plating only | 1-5 | 0.002t to t. |

The first line of the table indicates that, where oxygen enrichment and improvement of electrical resistivity is the only effect desired, the material should contain about 0.05–0.5% copper; also, that some degree of improvement is noticeable after about 2% of the total diffusion time has elapsed. Thus, if it would require 100 minutes for the total removal of copper by outward diffusion, some degree of electrical improvement would be noticed after about 2 minutes of treatment. This improvement would increase with time up to 100 minutes, but in exponentially-decreasing increments. Likewise, if a continuous film for terminal or plating purposes is desired the minimum amount of copper is about 0.3%. With reference to the 100 minute illustration above, a treatment time of at least 10 minutes would be required to attain a continuous film that would be at all useful.

In practicing the invention, a suitable glass melt is initially provided. Such glass will have a composition adapted to provide the desired ferroelectric glass-ceramic and additionally will contain a minor amount of copper oxide additive for present purposes. The glass is then drawn in ribbon form, or otherwise shaped to conform with the ultimate product application. The ribbons may be stacked or otherwise arranged for conversion to the desired glass ceramic body. The assembly or body is then heat treated in accordance with known practice to convert the glass to a glass-ceramic material by precipitation of fine-grained ferroelectric crystals throughout the glass body. Normally, this crystallization step is at a higher temperature than that at which copper can be diffused outwardly within the glass-ceramic material. Therefore, the material will be cooled to a suitable temperature and further heat treated for a time sufficient to produce the desired outward migration of copper in accordance with the guide lines established above. While these two heat treatments normally are at different temperatures, they may be consolidated providing the degree of crystallization at temperatures suitable for present purposes is sufficient or desirable for a given application.

In the event that it is desired to form a copper film on the material surface, the layer of copper oxide formed by outward migration may be exposed to a hydrogen atmosphere at about 300° C. to reduce the copper oxide while not substantially altering the glass-ceramic material. Such copper film may then be plated or otherwise treated as required for production of a particular product.

The invention is further described and its advantages illustrated in the following specific examples:

EXAMPLE I

Small thin discs about 1 cm. in diameter and 0.6–0.8 mm. in thickness were produced from three different glasses, each glass having the same base composition but respectively containing 0.0%, 0.1%, and 0.6% copper oxide ($Cu_2O$) as an additive. The composition of the base glass in percent by weight was approximately 55.3% BaO, 24.4% $TiO_2$, 8.3% $SiO_2$, 8.0% $Al_2O_3$, 1.0% CdO, 1.0% ZnO, and 2.0% $BaF_2$.

The test pieces thus provided were surface etched to remove a thin layer of silica-rich surface material produced by quenching when the discs were formed. After rinsing and drying, the discs were then fired in a hydrogen atmosphere at a temperature of 1100° C. for a period of 7 hours to convert the glass to the glass-ceramic state and produce a slightly-reduced, semiconductive glass-ceramic body having barium titanate crystals dispersed in a silicate matrix. The reduced glass-ceramic discs were then fired in an oxidizing atmosphere at 930° C. for varying times to produce an oxidized surface or barrier layer on each surface of the disc. Between these oxidized layers is sandwiched an interior layer of the reduced semiconductive material, thus providing the basic element in a barrier layer capacitor.

The capitance in microfarads/$cm.^2$ and the combined thickness of the barrier layers in microns were measured for each disc. Average values were determined for the disc of each glass treated at each firing schedule, and the following data thus determined:

TABLE IV

| $Cu_2O$ content (percent by wt.) | 0.0 | 0.0 | 0.0 | 0.1 | 0.1 | 0.1 | 0.6 | 0.6 | 0.6 |
|---|---|---|---|---|---|---|---|---|---|
| Oxidation, minutes | 3 | 9 | 27 | 3 | 9 | 27 | 3 | 9 | 27 |
| Capacitance, F/$cm.^2$ | 0.14 | 0.05 | 0.015 | 0.17 | 0.06 | 0.016 | 0.18 | 0.10 | 0.03 |
| Barrier, depth | 2.7 | 7.2 | 22.0 | 2.2 | 5.9 | 21.6 | 2.1 | 3.6 | 12.0 |
| Ohm × farad | 1.4 | 50 | 1,500 | 1.7 | 600 | 1,600 | 18 | 1,000 | 3,000 |

It will be understood that the hydrogen reduction treatment leaves the material in a slightly porous condition whereby oxygen diffusion through the material can occur to a certain extent. The data in the foregoing table indicate that the depth of the oxidized barrier layer is produced faster with copper absent from the material because no plating develops on its surface, but that the copper-containing materials have higher capacitance values at comparable insulation resistance. This indicates that, in a copper doped material, oxidation occurs relatively slowly but more completely or to a higher degree as evidenced by the increased ohm × farad product.

EXAMPLE II

Polished test pieces were produced from a glass having essentially the composition of Example I except that all of the barium was present as the oxide and the glass contained 0.1% copper oxide as additive. The polished test pieces were heated at 1150° C. for 2½ hours in a hydrogen atmosphere to produce glass-ceramic bodies containing about 60% by volume of barium titanate ($BaTiO_3$) in a slightly-reduced, semiconductive state. These semicrystallized bodies were then exposed to an oxidizing heat treatment in air at 930° C. for three minutes. It was observed that an oxidized layer had formed at both faces of each test piece with a total thickness of about 12 microns. Copper oxide crystallites were visible on the surface of the material when examined under a microscope. Measurements made by applying metal electrodes to the opposite faces of each test piece indicated that the material had a capacitance of 0.06 microfarads/$cm.^2$ and a resistivity of $10^{13}$ ohms/$cm.^2$. Measurements on test pieces produced in identical manner except for use of a glass containing no copper additive showed a resistivity of about $10^{12}$ ohms/$cm.^2$, a value lower by a factor of about 10.

EXAMPLE III

Test pieces were produced from a glass corresponding to that of Example II except for the presence of 0.6% copper oxide as an additive. These samples were reduced by a hydrogen treatment as in Example II and then subjected to an oxidizing atmosphere at 930° C. for twelve hours. After this treatment, it was observed that an oxidized dielectric barrier layer of about 100 microns thickness was formed on each side of a specimen and that a continuous copper oxide film had developed on each piece of the material. This copper oxide film was reduced to metallic copper by a hydrogen treatment at 300° C. after which the copper was removed from the edges of the test piece to produce a capacitor element having separated plates. The capacitor element was determined to have a resistivity of $10^{13}$ ohm-cm. and to remain stable under operating conditions which caused failure in corresponding elements produced from a glass not containing copper.

EXAMPLE IV

The examples thus far have been concerned with the production of a barrier layer type capacitor element in which the outward diffusion of copper occurs simultaneously with the formation of the oxidized dielectric layers in the element. In such case, this is determined by the desired depth of the barrier layer. Further, since the hydrogen treatment produces a condition in the nature of porosity in the material, it is not possible to directly separate the effects of direct oxidation and copper diffusion, but these must be inferred indirectly as indicated.

Accordingly, test pieces of the same materials were converted to barium titanate glass-ceramics by a crystallizing heat treatment in air rather than in hydrogen. The resulting bodies had no porosity and therefore were not subject to any appreciable direct oxidation by oxygen. When these glass-ceramic bodies were heat treated at 950° C. for varying times, it was ascertained that an observable improvement of insulation resistance and life test stability was obtained in about ⅒ of the time calculated for complete diffusion of copper content out of the body.

EXAMPLE V

Test pieces having a thickness of about 250 microns were produced from a glass having the following approximate composition in percent by weight:

| | Percent |
|---|---|
| $Nb_2O_5$ | 53.5 |
| BaO | 24.3 |
| PbO | 8.5 |
| $SiO_2$ | 6.5 |
| $B_2O_3$ | 3.8 |
| $Al_2O_3$ | 2.8 |
| $Cu_2O$ | 0.6 | the glass test pieces was converted by heat treating for 2 hours at 1000° C. to glass-ceramic bodies in which the primary crystal phases were meta-niobates of barium and lead. Following this crystallizing treatment, the test pieces were held at a temperature of 830° C. for 2 hours and then cooled to room temperature. A reddish stain characteristic of copper oxide was visible on the surface of the bodies.

The bodies thus produced were incorporated into capacitors which performed satisfactorily in a 1000 hour life test at 150° C. under an applied D.C. field of $3 \times 10^{+4}$ volts/cm. Capacitors made from elements produced in identical manner except that the parent glass materials had no copper addition were produced and subjected to the same life test. These capacitors failed in varying times by degradation of insulation resistance and resulting short circuits through the element. This indicates that the copper-containing elements produced a material having a higher and/or more nearly uniform degree of resistivity throughout the body after the copper was removed by the heat treatment.

EXAMPLE VI

Glass ribbons of about 40 microns thickness were drawn from a melt of the niobate glass of the preceding example. Several layers of these glass ribbons were arranged in a vertical stack with alternating gold foil electrodes separating adjacent glass ribbons. This stack assembly was then heated to a temperature in the range of 850–900° C. in a furnace. At this temperature, pressure was applied to the stack to seal the softened glass together to form a monolithic multilayer capacitor. The sealed body was then held for at least 10 minutes in the furnace at constant temperature to cause crystallization and formation of a glass-ceramic from a glass material. Capacitors produced in this manner were compared with capacitors produced in identical manner except that the parent glass material contained no copper additive. It was observed that the capacitors produced from copper-containing glass showed less than ½ the drift of capacitance exhibited by the capacitors produced from glasses containing no copper.

EXAMPLE VII

Glass test pieces having a thickness of 1.0 mm. were produced from the glass corresponding to that of the preceding example except that the glass contained 3.0% copper oxide as an additive. The test pieces were then converted to high dielectric constant glass-ceramics by heat treatment at 800° C. for two hours which also simultaneously caused migration of the copper. The glass-ceramic bodies thus produced were found to have a fairly heavy oxide film covering the body. This was reduced to a copper film suitable for forming copper electrodes by heat treating in a hydrogen atmosphere at 300° C., such treatment having no appreciable effect on the glass ceramic body as such.

EXAMPLE VIII

Glass test pieces corresponding to those of the preceding example were heat treated at 1000° C. for two hours. This resulted in the production of glass-ceramic bodies having niobate crystal phases, but practically no copper oxide could be observed on the surface of the body. Thereafter, the bodies were further heat treated at a temperature of 800° C. for two hours. When then observed, the bodies had a copper oxide film, corresponding to that formed on the bodies in the preceding examples. However, the glass-ceramic body had a dielectric constant 2 to 3 times higher than that of the material converted at 800° C. This indicates the desirability of carrying out the crystallization heat treatment at a higher temperature than that which is effective for the copper outward diffusion.

We claim:
1. A method for improving the electrical properties of a ferroelectric glass-ceramic body made by the controlled crystallization of a glass body through heat treatment thereof, comprising the steps of:
   (A) forming a glass body having from 0.05–5% by weight of cuprous oxide and capable of conversion to a glass-ceramic being composed of ferroelectric crystals selected from the group consisting of titanates, niobates, zirconates, and tantalates of Group I and Group II elements and mixtures thereof dispersed in a glassy matrix; and
   (B) heating the body to a temperature within a 300° C. range, the lower limit of which is slightly above the annealing point of the glass, for a time sufficient to cause outward diffusion of cuprous ions in the body but not substantially exceeding that time required to completely remove the cuprous ions from the interior of the glass-ceramic body by outward diffusion, so as to improve the electrical properties of the glass-ceramic body, which properties include the resistance to electrical breakdown when said body is exposed to operating temperatures between 50° and 200° C. and D.C. electrical fields in excess of 10⁴ volts per centimeter.

2. A method as recited in claim 1 further comprising the step of heating the glass body to a temperature higher than that effective to cause the outward diffusion of cuprous ions for times sufficient to cause the glass to be crystallized in situ to a glass-ceramic body containing a ferroelectric crystal phase, prior to heating the body to cause the outward diffusion of cuprous ions.

3. A method according to claim 1 wherein 0.05–0.5% by weight of cuprous oxide is incorporated into the base glass composition and the time of heating sufficient to cause outward diffusion of cuprous ions is within the range (0.02–1) $t$, where $t$ is the time required to totally diffuse the cuprous ions out of the body.

4. A method according to claim 1 wherein 0.3–1% by weight of cuprous oxide is incorporated into the base glass composition and the time of heating sufficient to cause outward diffusion of cuprous ions is within the range (0.01–1) $t$, where $t$ is the time required to totally diffuse the cuprous ions out of the body.

5. A method in accordance with claim 1 wherein 1–5% by weight of cuprous oxide is incorporated into the base glass composition and the time of heating sufficient to cause outward diffusion of cuprous ions is within the range (0.002–1) $t$, where $t$ is the time required to totally diffuse the cuprous ions out of the body.

6. A method according to claim 1 wherein the ferroelectric glass-ceramic body is characterized by having a niobate crystal as the principal crystal phase and a temperature of heating to cause outward diffusion of cuprous ions in the body of about 650°–950° C.

7. A method according to claim 1 wherein the ferroelectric glass-ceramic body consists of barium titanate as the principal crystal phase dispersed in a matrix of a borate glass and the temperature of heating to cause outward diffusion of cuprous ions in the body ranges about 550°–850° C.

8. A method according to claim 1 wherein the ferroelectric glass-ceramic body consists of barium titanate as the principal crystal phase dispersed in a matrix of a silicate glass and the temperature of heating to cause outward diffusion of cuprous ions in the body ranges about 700°–1000° C.

References Cited

UNITED STATES PATENTS

| | | | |
|---|---|---|---|
| 3,146,114 | 8/1964 | Kiulighn | 65—33 XR |
| 3,282,711 | 11/1966 | Lin | 65—33 XR |
| 3,195,030 | 7/1965 | Herczog et al. | 65—33 XR |
| 3,231,456 | 1/1966 | McMillan et al. | 65—32 XR |
| 3,249,466 | 5/1966 | Lusher | 65—33 XR |
| 3,291,586 | 12/1966 | Chapman et al. | 65—33 |

FOREIGN PATENTS

| | | |
|---|---|---|
| 944,571 | 12/1963 | England. |
| 415,104 | 3/1966 | Japan. |

FRANK W. MIGA, Primary Examiner

U.S. Cl. X.R.

65—30, 32; 106—39; 252—62.2, 63.5